United States Patent Office 3,524,551
Patented Aug. 18, 1970

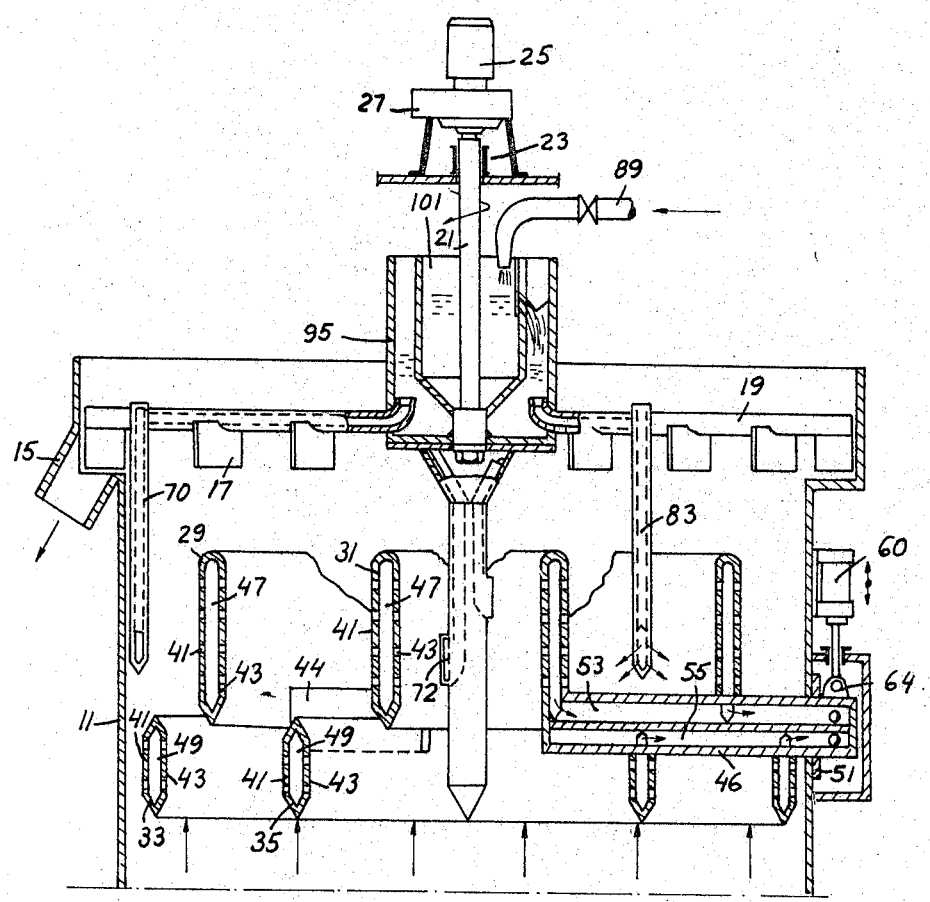

3,524,551
APPARATUS FOR CONCENTRATING AND/OR WASHING CELLULOSIC PULP
Ole Johan Richter, Karlstad, Sweden, assignor to Aktiebolaget Kamyr, Karlstad, Sweden
Filed Feb. 14, 1967, Ser. No. 616,102
Int. Cl. D21c 9/18; F26b 13/24
U.S. Cl. 210—342                                 3 Claims

ABSTRACT OF THE DISCLOSURE

The present invention concerns an apparatus for treating cellulosic pulp whereby the pulp may be, for example, thickened and/or washed. An upright cylinder adapted for axial pulp flow has therein disposed at least two sets of screening means, the individual sets being positioned at different levels along the lengthwise direction of the axis of the container. Each set of screening means comprises annular bodies of different diameters and are provided with conduits for removing liquid passing through said bodies. The diameters of the annular bodies of each set of screening means is disposed in a staggered relationship to adjacent sets of annular bodies, whereby a portion of pulp passing relatively far from the face of a first set of screening means will pass relatively near or at the face of a second set of screening means. Also provided are conduits for passing a wash or treating liquid into the pulp at selected levels of screening means.

---

The present invention relates to apparatus for concentrating and/or washing cellulosic pulp. Such devices are generally known; see U.S. Pat. No. 3,078,703 to Richter et al. where such a device is disclosed.

More particularly, the apparatus of the invention comprises an upright cylindrical container through which the pulp is fed axially, and at least two sets of screen bodies mutually offset in the axial direction, each set consisting of a number of annular screen bodies located at the same level and having different diameters, the screen bodies being provided with screen faces concentric to the shell of the container and having interior cavities for carrying-off liquid which has moved through the pulp in a direction essentially radial and transverse to the axis of the container.

The principal object of the invention is to provide uniform distribution of the screening effect over the cross-section of the container. This object is attained primarily by virtue of the fact that the screen bodies of one set have given diameter measurements which are different from the diameter measurements of the screen bodies of the other set. As a result of this, the axially fed pulp will in most places pass at a minimum distance to the screen faces of the screen bodies pertaining to said one set, different from the minimum distance to the screen faces of the screen bodies of the other set. In other words, a certain small pulp quantity that happens to flow quite close to a screen face of one set of screen bodies will later on flow past another set of screen bodies at a comparatively greater distance from any screen face thereof, and, as seen the other way, pulp flowing close to said last-mentioned screen face has previously flown past the first set of screen bodies at a comparatively greater distance from any screen face thereof. Irrespectively of whether a washing operation is to be performed by displacing part of the liquid contents of the pulp by supplied washing liquid, or merely part of the liquid contents of the pulp is to be screened-off in order to thicken the pulp, the above-mentioned different arrangement of the two or more sets of screen bodies reduces the inequality of treatment connected therewith. It will be appreciated that the upwardly rising pulp is braked in the vicinity of the screen faces so that the pulp flows somewhat faster approximately midway between two adjacent screen bodies of the same set. On account of the total number of screen bodies being divided into two or more sets located at different levels, the pulp may also be subjected to different treatments in succession, e.g. a thickening first step followed by one or more washing steps wherein the pulp is washed by means of supplied washing liquid that displaces the previous liquid contents of the pulp out through the screen faces. Furthermore, with the division of the screen bodies into two or more sets which are axially displaced relatively to each other, and with the staggered diameters of the screen bodies, the essentially horizontal and transverse flow of the liquid through the pulp reverses its direction as the pulp moves from one to the other of the screen body sets, thus further contributing to the equalization of the screening effect over the entire cross-section of the container.

The invention will now be more fully described with references to the accompanying drawing which is a diagrammatic vertical sectional view of an apparatus having a screening arrangement in accordance with the present invention.

The embodiment shown in the drawing is adapted for thickening as well as washing of digested and defibrated cellulosic pulp, e.g. in connection with the discharge thereof from a continuous cellulose digester. The numeral 11 designates the shell of an upright cylindrical container, into the lower end (not shown) of which the pulp is fed continuously so that the pulp rises slowly in the vertical direction through the container at a rate which is as uniform as possible over the cross-section thereof. Provided at the top of the container is a discharging device which discharges the rising pulp through a lateral outlet 15. Said discharging device may consist of a scraper having oblique blades 17 carried by radial arms 19 attached to a rotary vertical shaft 21. Said shaft is located centrally in the container and its upper end is journalled above the container in a bearing 23 and is driven by a motor 25 via a gear 27. If required, the container may be suitably closed at its top so that a low overpressure can be maintained therein.

Provided in the container is a screening device consisting of two sets of screen bodies, viz. an upper set consisting of two annular screen bodies 29, 31 concentric to each other and to the axis of the container, and a lower set consisting of two annular screen bodies 33, 35 which likewise are concentric to each other and to the axis of the container. Each of said four screen bodies is formed of two substantially cylindrical screen plates 41, 43, having slightly different diameters and being joined at their upper and lower edges. The distance between the screen plates is considerably less than their axial extension and is determined mainly with regard thereto that the space between the screen plates should allow a free flow of liquid screened-off and with regard to the mechanical rigidity. Thus, in a radial and vertical cross-section the screen body has a configuration which is elongated in the vertical direction and has pointed or rounded ends in order to offer the least possible resistance to pulp flow in the axial direction. The screen plates 41, 43 are substantially vertical throughout and are provided with perforations or apertures or vertically extending slits over substantially the entire surface thereof. Liquid separated from the pulp penetrates into the cavities 47, 49 of the screen bodies. The screen bodies are rigidly attached to horizontally and radially extending carrying arms 44, 46, the outer ends of which extend through apertures in the shell 11 of the container, said apertures being sufficiently extended in the vertical direction to allow a restricted movement of the carrying arms in the axial direction of the container. Plates 51 attached to the carrying arms, cover said apertures whereby the leakage therethrough is reduced. The carrying arms are provided with interior passages 53, 55 through which the liquid screened-off by the screen bodies is led off to two separate exterior outlet conduits. The upper passages 53 of the carrying arms are connected to the cavities 47 of the screen bodies 29, 31 of the upper set, and the lower passages 55 are connected to the cavities of the screen bodies 33, 35 of the lower set. The screen bodies can be moved vertically as a rigid unit by means of an operating device located outside the container and acting upon the outer ends of the carrying arms 44, 46. For each carrying arm there is attached to the outside of the container shell a hydraulic or pneumatic cylinder 60 having a vertically displaceable piston which is connected to an attachment 64 upon the end of said carrying arm.

In accordance with the invention the two sets of screen bodies are designed differently as to the diameter measurements of their screen bodies. Thus, the screen body 33 is of a great diameter than the screen body 29, and the screen body 35 is of a greater diameter than the screen body 31. Further, the screen body 35 is of a diameter which lies between, preferably approximately midway between the diameter measurements of the screen bodies 29, 31, whereas the diameter of the screen body 33 lies between, preferably midway between the diameter measurements of the screen body 29 and the container shell 11. If the number of screen bodies in each set is increased to three or more, the same applies to the additional screen bodies, viz. that no screen body of one set shall be of the same diameter as any screen body of the other set. If the screen bodies are counted in order of increasing diameters, then every second will be found in the upper set and the rest in the lower set. The diameter measurements of all the screen bodies form a series in which the values gradually increase. Preferably the diameter measurements increase with equally great increments, i.e. when there are two sets, screen bodies of one set should have diameters approximately midway between the diameter measurements of the next wider and the next narrower screen body of the other set. In each set the diameter values of the screen bodies are chosen such that the screening effect will be quite evenly distributed over the cross-sectional area of the container. Therefore, with at least two sets of screen bodies, the screening effect is efficiently distributed over the cross-sectional area of the container. In each set the screen bodies are located at the same level, but the two sets of screen bodies are axially offset. Thus, the upper edges of the screen bodies 33, 35 of the lower set are located in approximately the same horizontal plane, and said plane is located considerably lower than the horizontal plane extending through the upper edges of the screen bodies 29, 31 of the upper set. As shown in the drawing, the first-mentioned horizontal plane approximately coincides with the horizontal plane extending through the lower edges of the screen bodies of the upper set, but it may instead be situated at a distance therefrom, preferably considerably lower than said last-mentioned plane.

When the pulp rises past the screen bodies 33, 35, part of its liquid contents is screened-off whereby the pulp thickens. The transverse flow of the liquid towards the screen apertures tends to press the pulp against the screen plates so as to increase the friction of the pulp thereagainst. Therefore, there is a tendency of the pulp to rise quicker at locations farther away from the screen faces than at locations at or near the screen faces. When the pulp then moves past the upper set of screen bodies, the screen faces thereof exert a similar frictional or braking effect. However, the upper set of screen bodies mainly retards the pulp portions which previously passed the screen faces of the lower set of screen bodies at a comparatively greater distance. In this manner, the overall differences in the vertical feed rate of the pulp at different radial distances from the axis of the container are effectively abated.

When the pulp flows past the upper set of screen bodies the pulp may be washed, the liquid contents of the pulp being wholly or partly displaced by the supplied washing liquid. Said washing liquid which may consist of plain water or filtrate taken from any subsequent pulp filter, is spread in the pulp through outlet orifices located upon vertical spray tubes 70, 83 supported by the arms 19 of the scraper, and also through an outlet orifice 72 upon the extended lower end of the shaft 21. The washing liquid which is taken from a centrally located rotary tank 101 filled up through a conduit 89, is distributed by means of adjustable spillways formed in the shell of said tank, upon compartments of an outer tank 95, which compartments by means of conduits in the shaft 21 and in the carrying arms 19 are connected to said spray tubes and outlet orifices.

Of course, the above described embodiment may be modified as to its details, without departing from the spirit of the invention and the scope of the invention as set forth in the following claims. A number of such modifications of the present invention will be readily apparent to one skilled in the art. For instance, the screen bodies may be rotatable and connected to the shaft 21, instead of being moveable axially. Further, the lower set of screen bodies could be used, too, for exchanging liquids in the pulp by spreading therein a liquid, preferably washing liquid, and having the same displace the liquid previously contained in the pulp. By controlling the liquid quantities supplied and screened-off, it is possible, according to requirements, to thicken or dilute the pulp in connection with the exchange of liquids taking place at the level of either set or both sets of screen bodies. The invention may be used not only for the separation of liquor from digested pulp and for the subsequent washing of the pulp, but also in bleaching towers for the separation of bleach reaction products from the pulp, for washing and possibly also for impregnation of the pulp with a new bleaching agent.

What is claimed is:

1. An apparatus for thickening and/or washing of cellulosic pulp, comprising an upright cylindrical container adapted for axial feed of pulp therethrough, and at least two sets of screen bodies, and sets being positioned at different levels along the lengthwise direction of the axis of the container and each set consisting of a plurality of annular screen bodies located at the same level, having different diameter measurements in the direction transverse to the axis of the container, formed with opposite screen faces concentric to the shell of the container and having interior cavities for carrying off such liquid as has moved through said screen faces, the said screen bodies of one set of screen bodies having diameter measurements in the direction transverse to the axis of the container different from the diameter measurements of the screen bodies of an adjacent set of screen bodies, whereby substantially all pulp particles will pass during their movement through the container at a different minimum distance to the screen faces of the screen bodies of said one set, than to any screen face of the screen bodies of said adjacent set, and whereby for at least part of the pulp an essentially horizontal and transverse flow of liquid through the pulp reverses its direction as the pulp moves from said one set to said adjacent set.

2. The apparatus of claim 1 wherein the said diameter measurement of each screen body in each set of two adjacent sets of screen bodies is such that any two screen bodies having the closest diameter measurements to each other are not in the same set of screen bodies.

3. The apparatus of claim 1, wherein at least one screen body of a first set of screen bodies has a diameter measurement approximately equal to the average of the diameter measurements of two adjacent screen bodies of a second set of screen bodies which said second set is adjacent said first set of screen bodies.

References Cited
UNITED STATES PATENTS 3,078,703 2/1963 Richter et al. _____ 68—181
3,348,390 10/1967 Richter _____ 68—181

S. LEON BASHORE, Primary Examiner
A. D'ANDREA, Jr., Assistant Examiner

U.S. Cl. X.R.
8—156; 68—19, 181; 162—60